Oct. 29, 1963   T. W. HAMILTON   3,108,649
WEIGHING MACHINES
Filed Jan. 19, 1961   3 Sheets-Sheet 1
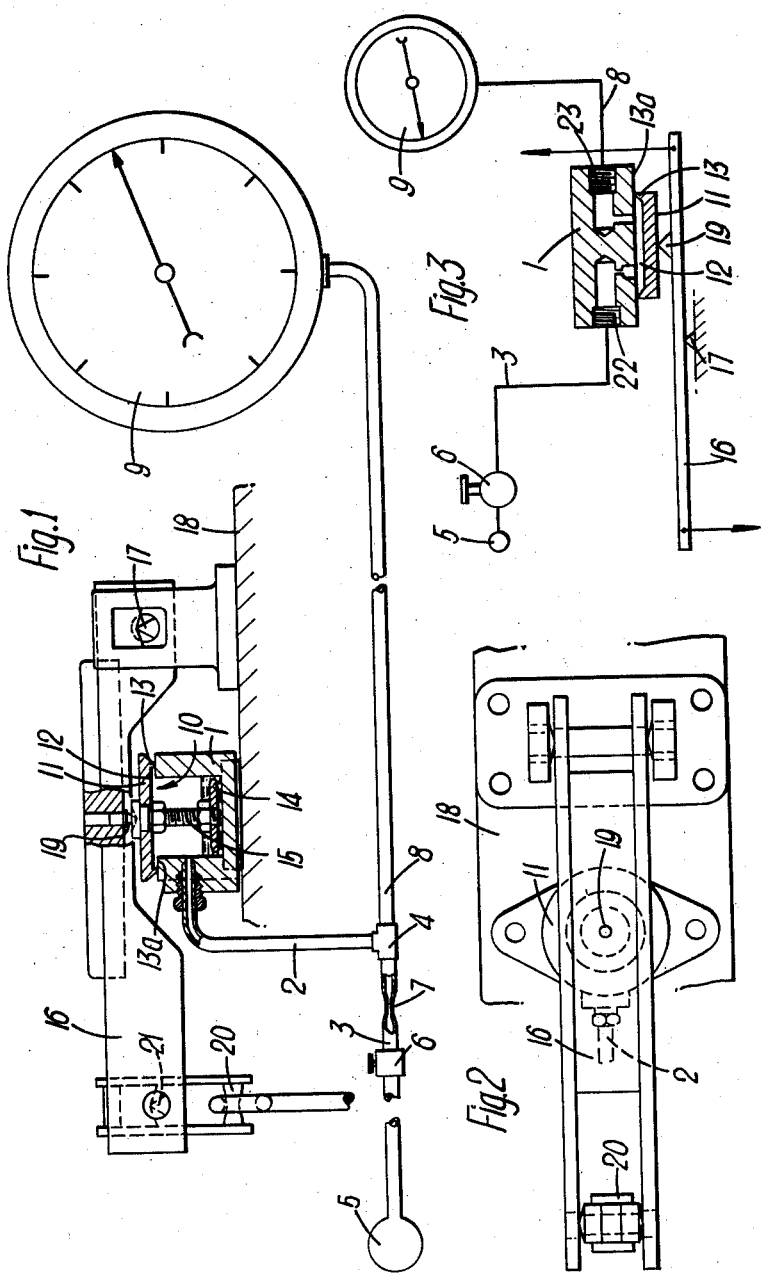
Inventor
THOMAS W. HAMILTON
By *Imirie & Smiley*
Attorneys

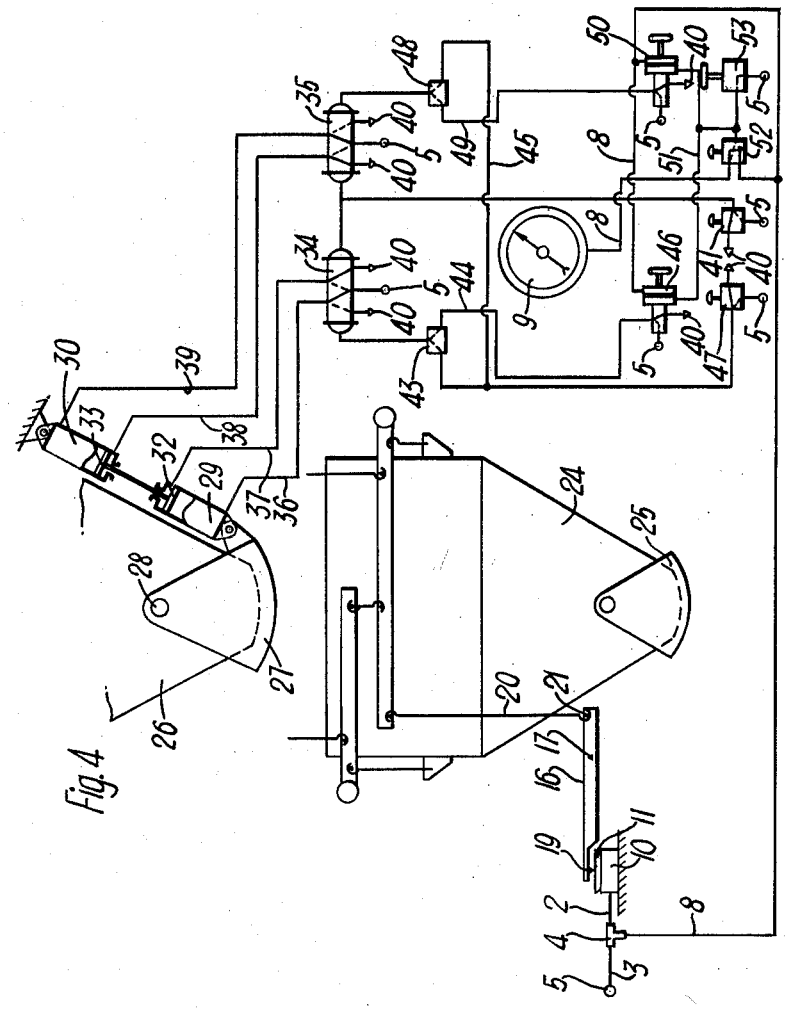

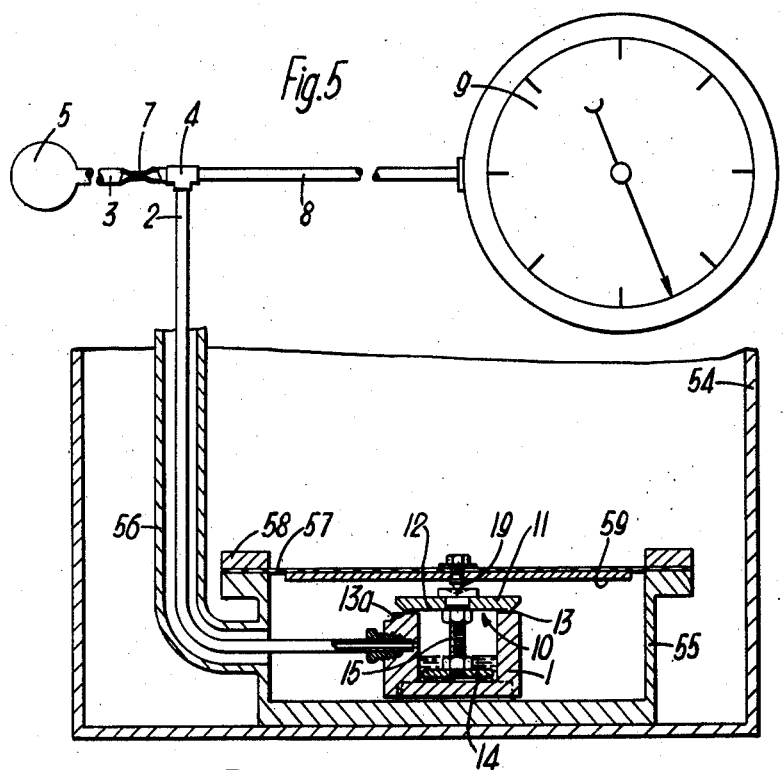
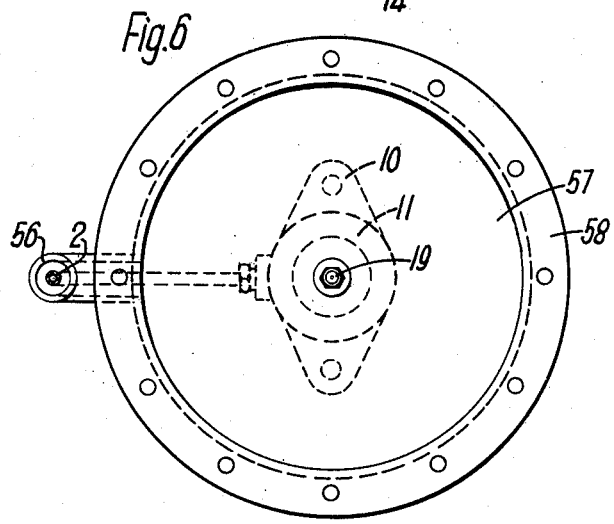

3,108,649
WEIGHING MACHINES
Thomas William Hamilton, 27 Clevehurst Close,
Stoke Poges, England
Filed Jan. 19, 1961, Ser. No. 83,764
Claims priority, application Great Britain Jan. 28, 1960
8 Claims. (Cl. 177—208)

It is sometimes necessary to transform a variable force applied to a member of a mechanism into a linear variable fluid, usually air or other gas, pressure which can be transmitted to a remote station where it may be measured to provide an indication of the force, or where it may perform some control operation in dependence upon its magnitude.

Transducing devices for performing this transformation have previously generally included a flexible diaphragm which is acted upon in one direction by the applied force and in an opposite direction by the fluid pressure which is to be transmitted. A valve closure member is directly connected to the diaphragm and when the force is greater than the resultant of the pressure, this valve is closed and the pressure acting on the diaphragm builds up. As the pressure continues to build up, the applied force is overcome and the valve opens. This allows fluid to escape and so the pressure on the diaphragm is reduced. Eventually an equilibrium is reached in which the valve is very slightly opened and there is a small escape of fluid. In these conditions the fluid pressure is very nearly proportional to the applied force. It is not, however, accurately proportional, because the stiffness of the diaphragm comes into play. Because of this difficulty these transducing devices have not been very sensitive or accurate. Instead of using a diaphragm it is possible to use a piston sliding in a cylinder, but in this case frictional forces come into action and again the device is not very sensitive or accurate.

According to the present invention a pressure transmitting device for transmitting a fluid pressure which is in linear relation to a variable applied force comprises a fluid pressure chamber adapted for connection with an inlet duct and throttling means by which there may be admitted to the chamber fluid under pressure greater than that to be transmitted and with an outlet duct at a position downstream of the throttling means, and a loose cover resting on a seating surrounding a relief opening in the chamber to effect closing of the opening, the arrangement being such that when fluid under pressure is supplied to the chamber and a variable force is applied to the cover the fluid pressure in the chamber and acting on the cover increases until the cover is moved off its seating against the applied force to allow fluid to escape from the relief opening to such an extent that equilibrium is established between the oppositely acting applied force and the equilibrium pressure and the latter which is in linear relation to the applied force is transmitted through the outlet duct.

Further according to the present invention, a pressure transmitting device for transmitting a fluid pressure which is in linear relation to a variable force comprises a fluid pressure chamber having an inlet duct with throttling means (whether by the use of a valve or not) for admitting fluid under a pressure greater than that to be transmitted and capable of causing a drop in the supply pressure to the lowest pressure to be transmitted by the device at a small flow rate, an outlet duct in communication with the inlet duct downstream of the throttling means and a fluid pressure relief opening which is closed by a loose cover which rests on a seating surrounding the opening, the cover being acted upon by a member by which the variable force is applied to it as a thrust such that when a force is applied to the member and fluid is supplied under pressure through the inlet duct, the pressure in the chamber increases until the cover is moved off it seating against the applied force to allow fluid to escape from the opening to such an extent that equilibrium is established between the oppositely acting pressure and thrust on the cover, the equilibrium pressure which is thus in linear relation to the thrust being transmitted through the outlet duct.

With these arrangements, since the cover is lifted from its seat when equilibrium is reached, the only forces acting on the cover are the applied force, its own weight and the fluid pressure. The weight of the cover, and of course any parts which may be directly fixed to it, is constant and therefore the pressure which is transmitted is in linear relation to the applied force within high limits of accuracy.

A damper may be provided to damp the movement of the cover off and on to its seating to prevent the cover from vibrating when the device is in use.

Transmitting devices in accordance with the invention may be used for a number of purposes. For example, they may be incorporated in gauges for indicating at a remote station the level of liquid in an oil or other tank, or they may be used in control systems or servo-mechanisms, for example, as a paper-tension regulating device in which the device transmits to the brakes of the paper machine a force such that the tension remains at a desired level, but they are particularly intended for use in weighing machines in which the weight of the object or the mass being weighed is transmitted to an indicator in a remote place. Such machines may be used, for example, in batching plant for weighing the materials which are subsequently mixed to make concrete. In such plant, it is desirable that the weight of the materials should be indicated to the operator of the concrete mixer who may be some distance from the weighing machine itself. Electrically operated repeaters have been used for this purpose connected to the dial or other indicator of the weighing machine, but as a supply of compressed air is commonly used for other purposes in batching plant and is therefore already available, a pneumatic transmission is more robust and therefore preferable to electrical devices.

A weighing machine in accordance with the invention comprises a pressure chamber having a relief opening, a seating surrounding the relief opening, a loose cover constructed to co-operate with the seating to close the opening, a carrier for a weight to be measured, mechanism arranged to apply a thrust tending to press the cover against its seating and to vary such thrust in linear relation to the weight applied to the carrier, an inlet duct, including throttling means, for the supply to the chamber of fluid under pressure, and means responsive to the fluid pressure and connected to the chamber downstream of the throttling means.

In order that the invention may be clearly understood some embodiments thereof will now be described, by way of example, with reference to the accompanying drawings, in which:

FIGURE 1 is an elevation, partly in section, of a pressure transmitting device according to the invention incorporated in a weighing apparatus, FIGURE 2 is a top plan of a part of FIGURE 1, FIGURE 3 is a diagrammatic elevation of a modified form of the apparatus of FIGURE 1, FIGURE 4 is a diagrammatic illustration of a remotely controlled weighing apparatus embodying a pressure transmitting device according to the invention, FIGURE 5 is a sectional elevation of apparatus embodying a pressure transmitting device according to the invention and adapted to monitor the level of liquid contained in a tank, and FIGURE 6 is a top plan of a part of FIGURE 5.

In the drawings like references refer to like or similar parts.

Referring to FIGURES 1 and 2, the pressure transmitting device comprises a fluid pressure chamber 1 which is connectable with an inlet duct 2, 3 and a T-joint 4 with a source 5 of fluid under pressure. The fluid under pressure is preferably compressed air, although it may, if desired, be oil or other hydraulic fluid, and the source 5 may be a static or portable compressed air generator or it may be a chamber adapted to store compressed air. Compressed air from the source 5 is admitted under control of throttling means indicated as a valve 6, which may be manually or automatically controlled, and passes to the portion 2 of the inlet duct through a constriction 7 which is also a throttle and may if desired, be the only throttle. The diameter of the constriction 7 is of the order of 1/64 inch. If desired, the constriction 7 may be replaced by a needle valve. An outlet duct 8 downstream of the adjustable valve 6 and constriction 7 connects the T-joint 4 and hence the chamber 1 with a pressure 9. As shown in FIGURE 1, the outlet duct 8 communicates directly with the inlet duct just upstream of the entry of the inlet duct into the chamber.

A pressure relief opening 10 in the top of chamber 1 communicates with the interior of the chamber and is covered by a loose cover 11, the underside of which is provided with a recess 12. An annular lip 13 which extends around the under surface of the cover 11 has a sharp sealing edge which rests on a seating 13a surrounding the pressure relief opening 10 and when a force is applied to the exterior top portion of the cover 11 the sharp edge of the lip 13 makes airtight sealing engagement with the chamber. As shown in the drawings, the cover 11 is horizontal and the seating 13a is flat and horizontal. A damper disc 14 depends from the cover 11, being carried by a stem 15 secured to the cover, and is located near the bottom of the chamber to be submerged in oil or other damping liquid contained in that portion of the chamber 1 which is remote from the cover. The damper is provided to damp movement of the cover off and on to the seating 13a and to prevent vibration of the cover.

It will be understood that a force to be measured may be applied through a member to the exterior of the top of the cover 11 in any desired manner, however in FIGURES 1 and 2 the force is applied thereto through a lever system which comprises a beam 16 pivoted at one end on a fulcrum 17 carried by a frame member 18 on which the chamber 1 is also supported. A pivot 19 is carried by the beam 16 at a position intermediate the opposite ends thereof and is engaged with the outer side of the cover 11. Load connection devices shown as shackles 20 are carried by a fulcrum 21 at the opposite end of the beam 16. The dimensions of the recessed portion 12 of the cover are selected according to the ratio to be observed between the resultant fluid pressure which supports the cover and which is measured by the gauge 9 when the lever system is in equilibrium and the load to be measured, the load being determined by the net mechanical ratio of the lever system.

In operation, valve 6 is opened to admit compressed air to the chamber 1 from source 5 through the constriction 7 at a pressure greater than that to be transmitted, the constriction causing a drop in the supply pressure to the lowest pressure to be transmitted by the device at a small flow rate. A load applied to beam 16 from the shackles 20 applies a force to the external portion of the cover 11 through the pivot 19 thus causing the cover to make sealing relation with the top of the chamber 1. The air pressure from source 5 passing to chamber 1 through the constriction 7 causes pressure to build up in the chamber and in the outlet duct 8 until the cover 11 lifts. Air then escapes from the chamber 10 reducing the pressure therein until it is in linear relation to the load applied to the beam 16. The cover 11 and the beam 16 are then in equilibrium. The air flow is very small and the pressure at the T-joint 4 is then the same as that in the chamber 1 and is transmitted to the gauge 9 which indicates the weight of the load applied to the shackles 20.

FIGURE 3 illustrates diagrammatically a modified embodiment of the apparatus of FIGURE 1 in which the cover 11 is disposed below the pressure chamber and the chamber has an inlet 22 and an outlet 23 connectable respectively with the inlet duct 2 and outlet duct 8 and connected by the recess 12 formed in the cover member. The outlet 23 is downstream of the adjustable valve 6 and of inlet 22 and mode of operation is the same as that described above with reference to FIGURE 1 but the fulcrum 17 for beam 16 is intermediate the ends of the beam.

FIGURE 4 illustrates diagrammatically a pressure transmitting device as described above adapted for use as a weighing head in a weighing machine used for the remote control of the weighing of material delivered from bulk to an open-topped container. The container 24 is supported by a compound lever system and is connected to the beam 16 through the shackle 20. Container 24 is provided with a gate 25 arranged by means, not shown, to open or close a discharge opening in the bottom of the container.

Above the container 24 is a storage hopper 26 having an outlet which is disposed over the container 24 and a gate 27 which is pivoted at 28 for rocking movement to and from positions at which it exposes or closes the outlet from the hopper. Operation of the gate 27 is effected by first and second fluid-operated devices which, as indicated in FIGURE 4, comprise air cylinders 29, 30 connected in tandem by a rod 31 which connects pistons 32, 33 housed in the cylinders. Movements of the pistons are controlled by first and second operating valves 34, 35 through lines 36, 37 and 38, 39. Valves 34 and 35 are fed from the compressed air source 5 and are exhausted by valves 40. The valves 34, 35 are connected in common with a start valve 41 through line 42 and valve 34 is connected through an emergency stop valve 43 and lines 44, 45 with a first diaphragm operated pressure switch 46 and a second emergency stop valve 47. Valve 35 is connected through an emergency stop valve 48 and line 49 with a second diaphragm operated pressure switch 50 and through line 45 with the stop valve 47.

The switches 46, 50 are connected to the output duct 8 to which the indicator 9 is also connected and through a line 51 which is common thereto with a bypass valve 52 and a pressure regulator 53 which are employed for pre-setting the apparatus.

The switches 46, 50 operate respectively to control closing of gate 27 first partially to allow only a slow flow of material to container 24 and then completely to cut off flow when beam 16 is in a state of equilibrium. To effect pre-setting of the switches 46, 50 the by-pass valve 52 is operated to disconnect indicator 9 from output duct 8 and to connect regulator 53 to output duct 8, and regulator 53 is then adjusted to pre-set the pressure on one side of the diaphragm of each switch 46, 50 so that the desired differential pressures are applied to said sides of the diaphragms, the exact differential values being determined by the relative spring pressures on the diaphragms. Valve 52 is then operated to reconnect indicator 9 to output duct 8.

The sequence of operation is as follows:

On operation of the start valve 41 compressed air from source 5 is passed by line 42 to the operating valves 34, 35 and through lines 37, 39 to fully open the gate 27.

When the pressure in the output duct 8 is slightly less than that pre-set on switches 46, 50 the switch 46 operates and through the operating valve 34 and line 36 causes cylinder 29 partially to close the gate 27 so that only a dribble of material passes through the gate into container 24. When the pressure in the output duct 8 equals that preset by regulator 53 the switch 50 passes an air signal along line 49 to the second operating valve 35 which then operates to pass air along line 38 to effect full closing of the gate 27.

The apparatus described with reference to FIGURE 4 is a pressure-responsive control device such as to provide an accurate cut-off of material from hopper 26 by remote control the switches 46, 50 having applied thereto a pressure substantially equal to that in the chamber 10 when the beam 16 with a load applied thereto is in a state of equilibrium.

FIGURES 5 and 6 illustrate a pressure transmitting device as described above adapted to form a control head or control apparatus for monitoring the level of liquid contained in a tank 54. As illustrated in FIGURES 5 and 6 the pressure transmitting device is housed in an enclosure member 55 located on the bottom of the tank 54 and the interior of the enclosure member is maintained at atmospheric pressure by a pipe 56 to permit satisfactory bleeding from the chamber 1. Pipe 56 extends upwards to a position which is above the highest level of liquid in tank 54 and the input duct 2 extends through pipe 56.

The open top of the enclosure member 55 is closed by a diaphragm 57 which is clamped to the rim of the enclosure member by a clamping ring 58 and a support plate 59 is carried by the diaphragm to prevent undue distortion thereof. The pivot 19 is carried by the diaphragm 57 and the thrust due to the column of liquid supported by the diaphragm is balanced against the pressure built up in chamber 1. Thus the reading on indicator 9 gives an indication of the liquid level in tank 54.

If desired, instead of the apparatus just described being located in the tank 54 it may be secured to the underside of the tank so that the diaphragm 57 covers an aperture in the bottom of the tank and is engaged by the liquid in the tank. When so arranged, the pipe 56 is not necessary.

Further, if desired, the damper above described may be omitted and to reduce noise due to bleeding the position at which the pivot 19 engages the cover 11 may be eccentric to the axis of the cover, also, if desired, a portion of the lip 13 may be resiliently urged against the seating 13a.

I claim:

1. A pneumatic pressure transmitting device for transmitting a pressure which is in linear relation to a variable applied force, comprising a source of constant fluid pressure greater than said pressure to be transmitted, a pressure chamber, a pressure fluid conducting inlet duct connecting said source of pressure to said chamber, pressure fluid throttling means in said inlet duct, said chamber having a pressure relief opening and a seat surrounding said opening, a cover engageable with said seat to close said opening, said cover being subject to the application of a variable force in a direction opposing the pressure in said chamber acting to disengage said cover from said seat, and a pressure fluid conducting outlet duct in communication with said inlet duct downstream of said throttling means for taking off pressure measured in said pressure chamber to a pressure responsive device.

2. A pneumatic pressure transmitting device for transmitting a pressure which is in linear relation to a variable applied force, comprising a source of constant fluid pressure greater than said pressure to be transmitted, a pressure chamber, a pressure fluid conducting inlet duct connecting said source of pressure to said chamber, pressure fluid throttling means in said inlet duct, said chamber having a pressure relief opening and a seat surrounding said opening, a cover engageable with said seat to close said opening, a damper acting on said cover to damp its movements and prevent it from vibrating on said seat under continuous flow of pressure fluid into and out of said pressure chamber, said cover being subject to the application of a variable force in a direction opposing the pressure in said chamber acting to disengage said cover from said seat, and a pressure fluid conducting outlet duct in communication with said inlet duct downstream of said throttling means for taking off pressure measured in said pressure chamber to a pressure responsive device, whereby a variable force applied to said cover will move said cover against said seat in opposition to pressure of fluid continuously conducted to the pressure chamber through said inlet duct, the pressure in said chamber increasing until said cover is disengaged from said seat against said applied force to allow fluid to escape through said opening and equilibrium to be established between the oppositely acting pressure and force on said cover, the fluid pressure within the chamber at said equilibrium condition being in linear relation to said applied force and being transmitted through said outlet duct.

3. A device according to claim 2, wherein said damper comprises a plate, means fixing said plate to said cover and damping liquid retained in said chamber, said plate being immersed in said liquid and movable in a direction normal to the surface thereof.

4. A device according to claim 2, wherein said throttling means is an adjustable throttling valve.

5. A device according to claim 2, in which said outlet duct communicates directly with said inlet duct just upstream of the entry of said inlet duct into said chamber.

6. In a weighing machine including a carrier for the weight to be measured, a thrust member, a mechanism connecting said carrier to said member in such a way that the thrust in said member is in linear relation to said weight, means for transmitting a pneumatic pressure in linear relation to said thrust, a pressure measurement device and means connecting said device to said pneumatic pressure transmitting means, said measurement device being calibrated to register directly the weight carried by said carrier, the improvement wherein said pressure transmitting means comprises a pressure chamber, a source of constant fluid pressure, a pressure fluid conducting inlet duct connecting said source of pressure with said chamber, throttling means in said inlet duct, said chamber having a pressure relief opening and a seat surrounding said opening, a cover engaging said seat to close said opening, a damper acting on said cover to damp its movements and prevent it from vibrating on said seat under continuous flow of fluid into and out of said pressure chamber, means for applying the thrust of said thrust member to said cover in a direction opposing the pneumatic pressure in said chamber acting to disengage said cover from said seat, and a pressure fluid conducting outlet duct in communication with said inlet duct downstream of said throttling means and connected to said pressure measurement device.

7. A weighing machine according to claim 6 for weighing bulk material supplied from a hopper, said machine further comprising a hopper, a control device connected to said outlet duct, and means operated by said control device for cutting off the supply of material from said hopper to said carrier when the weight of material in said hopper reaches a predetermined magnitude.

8. An indicator for indicating liquid level comprising in combination a tank, a membrane arranged on said tank to receive the pressure of liquid in the tank, and a pneumatic pressure transmitting device, said transmitting device comprising a pneumatic pressure chamber, a source of constant fluid pressure, a pressure fluid conducting inlet duct connecting said source of pressure to said chamber, throttling means in said inlet duct, said chamber having a pressure relief opening and a seat surrounding said opening, a cover engaging said seat to close said opening, a damper acting on said cover to damp its movements and prevent it from vibrating on said seat under continuous flow of fluid into and out of said pressure chamber, means for applying pressure of liquid in the tank through said diaphragm to said cover in a direction opposing pneumatic pressure in said chamber acting to disengage said cover from said seat, and a pressure fluid conducting outlet duct in communication with said inlet duct downstream of said throttling means for taking off pressure measured in said pressure chamber to a pressure responsive device.

References Cited in the file of this patent

UNITED STATES PATENTS

| | | |
|---|---|---|
| 2,097,551 | Garlinghouse | Nov. 2, 1937 |
| 2,592,569 | Henderson | Apr. 15, 1952 |
| 2,662,539 | Markson | Dec. 15, 1953 |
| 2,705,607 | Inglett | Apr. 5, 1955 |

FOREIGN PATENTS

| | | |
|---|---|---|
| 657,713 | Germany | Mar. 15, 1938 |